(No Model.)
J. R. HALDEMAN.
RAILROAD RAIL.
No. 413,053. Patented Oct. 15, 1889.
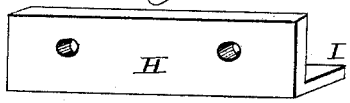
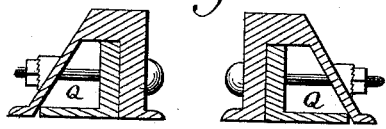
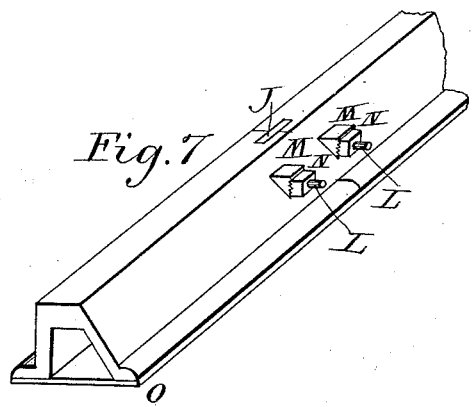
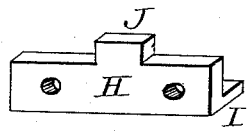
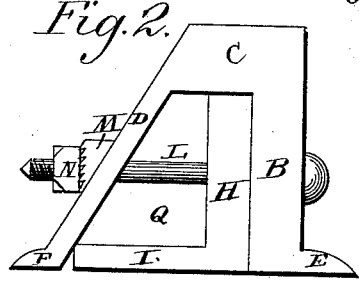
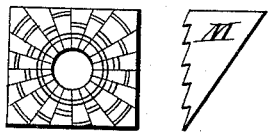
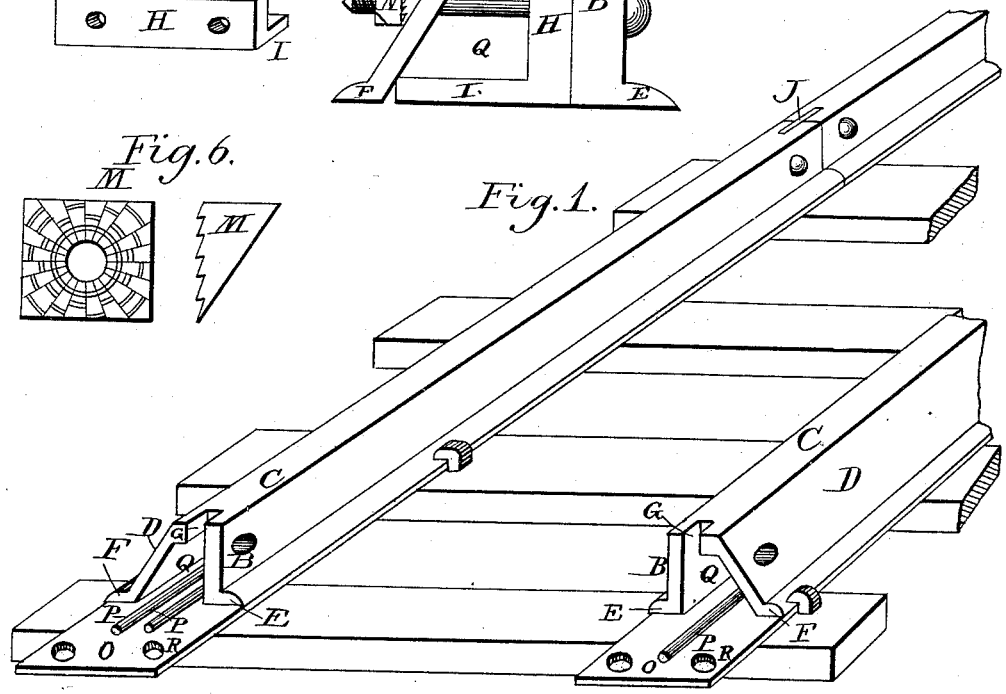
Witnesses
Daniel M. Davison
Chas. S. Morman.
Inventor
John Riley Haldeman

UNITED STATES PATENT OFFICE.

JOHN RILEY HALDEMAN, OF BLOOMINGTON, ILLINOIS.

RAILROAD-RAIL.

SPECIFICATION forming part of Letters Patent No. 413,053, dated October 15, 1889.

Application filed December 17, 1888. Serial No. 293,926. (No model.)

*To all whom it may concern:*

Be it known that I, JOHN RILEY HALDEMAN, a citizen of Bloomington, in the county of McLean and State of Illinois, have invented a new and Improved Railroad-Rail, of which the following is a specification.

My invention relates to improvements in railroad-rails; and the objects of my invention are, first, to provide a rail and coupling which shall do away with the jar produced by cars passing over the joint between two ordinary rails; second, to provide a washer that shall prevent the nut on bolts at couplings from unscrewing; third, to provide a rail in which the weight of the cars shall rest directly upon a perpendicular standard; fourth, to provide a rail which will not twist or turn on curves or when subjected to severe weight or strain; fifth, to provide a tube or tunnel within the rail for the conveyance of telegraph and electric-light cables.

In the accompanying drawings, Figure 1 shows the rails laid upon cross-ties, with view of ends of rails, with slots G G in ends of rails, and also joint with two rails secured together. Fig. 1 also shows iron or steel plates O O, upon which the A-rail rests, thus forming the tunnel Q. Fig. 2 shows end views of rail and fish-plate, with bolt, nut, and washer. Figs. 3 and 4 show fish-plate with and without top projection J. Fig. 5 shows a sectional view of right and left hand rails with fish-plates in position. Fig. 6 shows face and end of corrugated washer M. Fig. 7 is a perspective view of the exterior of the joint.

The A railroad-rail is made by rolling the iron or steel between two rollers of such shape that the inside or under side of the rail will be formed hollow, (see Figs. 2, 5, and 7,) making the upright B, Fig. 2, perpendicular, with a foot E, Fig. 2, upon its lower outer edge. This upright B, Fig. 2, after rising the proper height, is bent at right angles the requisite width to form a flat bed or face C, Fig. 2, upon which the car-wheels run. From the outside or edge of this bed, as a support to the main upright, runs the brace D, Fig. 2, down at an angle of from forty degrees to sixty degrees to a line on the same plane with the bottom of the perpendicular upright, and upon this brace, at its base, is a foot F, Fig. 2, on which to secure the spike-heads. The rail thus formed has the perpendicular upright on the inside, so the weight of the cars is upon this main upright B, Fig. 2, and the side standard or brace D, Fig. 2, forms a secure brace to the rail, preventing it from turning or spreading. The ends of the rails are secured together with one fish-plate or coupling, Fig. 3, consisting of an upright standard H, Fig. 2, which extends to the under side of the top face of the rail, with a bottom plate I, Fig. 2, at right angles to the upright standard H, Fig. 2, and the full width of the inside space of the rail, thus forming a rest for the rails, as well as a secure coupling, Figs. 2 and 5. There is also a projection J J, Fig. 4, from center of said fish-bar upright, which fits into slots G G, Figs. 1 and 7, in the ends of the rails, thus breaking the straight joints and preventing the jolting and jarring motion caused by the wheels passing over the ordinary joints in the common T-rail. Said fish-plate is secured within the rails by bolts L L, Fig. 7, extending through the rails, and having a beveled washer M, Fig. 6, fitting to face of standard or slanting brace D, Figs. 2 and 7. The face of this washer M, Fig. 6, has corrugated teeth, which prevent the nut N, Fig. 2, from unscrewing by the jar of passing cars. The whole rail so constructed is laid upon thin flat bars of iron or steel O O, Fig. 1, the exact width of bottom of rail, thus forming a continuous hollow tube, Figs. 1 and 7, through which can be conducted one or more electric cables P, Fig. 1, in one rail for telegraphic purposes, and in the other rail for the purpose of lighting switch-lamps, stations, signal-lamps, &c., by electric light.

What I claim as my invention, and desire to secure by Letters Patent, is—

1. The A railroad-rail with the upright standard B, top bed C, brace D, and feet E F, as set forth.

2. The combination, with the A-rail comprising the parts B C D, of the fish-plate or coupling having the standard H and the foot-rest I, as set forth.

3. The combination, with the A-rail comprising the parts B C D, the parts C being provided with the slots at the ends of the fish-plates H I, having the projections J J, as set forth.

4. The beveled washer M, in combination with B C D and H I and bolt L, as set forth.

5. The combination, with the A-rail comprising the parts B C D, of the plate O, perforated as at R, the whole forming a tube or tunnel for the inclosure of electric wires, as set forth.

JOHN RILEY HALDEMAN.

Witnesses:
DANIEL M. DAVISON,
CHARLES S. MORSMAN.